Nov. 1, 1960 G. P. WAKEFIELD 2,958,761
OVERHEAD LIGHTING EQUIPMENT
Filed Sept. 14, 1955 3 Sheets-Sheet 1

INVENTOR.
GEORGE P. WAKEFIELD
BY
Oberlin & Limbach
ATTORNEYS

Nov. 1, 1960  G. P. WAKEFIELD  2,958,761
OVERHEAD LIGHTING EQUIPMENT
Filed Sept. 14, 1955  3 Sheets-Sheet 2

INVENTOR.
GEORGE P. WAKEFIELD
BY
Oberlin &Limbach
ATTORNEYS.

Nov. 1, 1960 G. P. WAKEFIELD 2,958,761
OVERHEAD LIGHTING EQUIPMENT
Filed Sept. 14, 1955 3 Sheets-Sheet 3
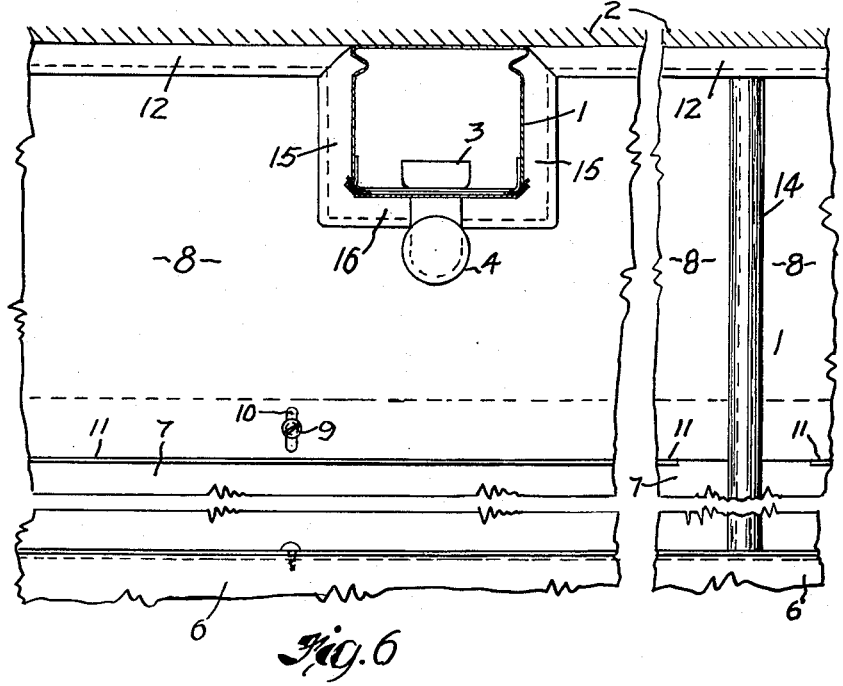
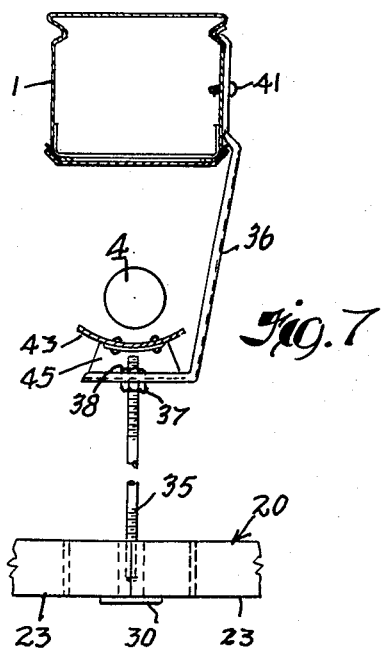
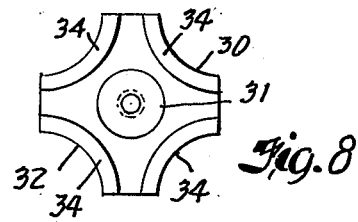
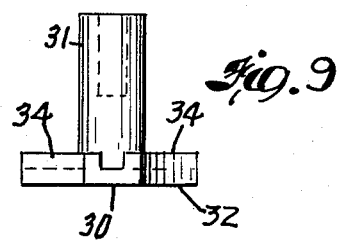
INVENTOR.
GEORGE P. WAKEFIELD
BY
Oberlin & Limbach
ATTORNEYS.

United States Patent Office 2,958,761
Patented Nov. 1, 1960

2,958,761

OVERHEAD LIGHTING EQUIPMENT

George P. Wakefield, Vermilion, Ohio, assignor to The Wakefield Company, Vermilion, Ohio, a corporation of Ohio Filed Sept. 14, 1955, Ser. No. 534,218

4 Claims. (Cl. 240—9)

The present invention relates generally as indicated to overhead lighting equipment, and more particularly to an overhead room lighting system in which a substantially continuous light-diffusing sub-ceiling is supported beneath ceiling-attached lighting fixtures, such lighting system providing over-all, low brightness illumination either of the entire room area or of that portion of the room area which is beneath such sub-ceiling.

The present invention may, accordingly, be appropriately referred to as a "luminous ceiling," a commonly used term in the art. The present practice in such luminous ceilings is to provide parallel rows of ceiling-attached fluorescent lighting fixtures beneath which the luminous or light-diffusing sub-ceiling is supported as by means of parallel elongated support members which underlie opposite marginal edges of light-diffusing panels as, for example, is disclosed in the Wakefield Patent No. 2,659,807 and the Beckwith Patent No. 2,659,808.

In some installations, framed light-diffusing panels are supported by a grid-like framework composed of perpendicularly related support members extending lengthwise and crosswise of the room space.

It has also been the prior practice to treat each room of a building as a separate installation, whereas a certain amount of installation time and expense may be saved by providing continuous rows of fluorescent fixtures extending substantially continuously in end-to-end relation from one outside wall of the building to the other and above partition walls which terminate short of the ceiling proper.

With the foregoing in mind, it is one principal object of this invention to provide an overhead lighting system in which the light-diffusing sub-ceiling is substantially continuous and uninterrupted wtihout intervening longitudinal or criss-cross support members.

It is another object of this invention to provide a continuous light-diffusing sub-ceiling as aforesaid which is composed of edgewise abutting light-diffusing panels, the marginal edge portion of the sub-ceiling being supported as by wall-attached angles or like members and the edgewise abutting panels having their corners held together and supported as by headed hanger rods depending downwardly from the ceiling-attached lighting fixtures, the hanger rods being provided with small and relatively unnoticeable heads or rosettes.

It is another object of this invention to provide an overhead room lighting system of the character indicated in which the individual light-diffusing panels may be easily displaced or removed to provide access to the lighting fixtures thereabove for re-lamping or other servicing.

Another object of this invention is to provide an overhead room lighting system of the character indicated in which the light-diffusing panels are uniformly perforated or honeycombed and are so arranged that the abutting edges thereof define similar perforations so as to create the illusion of the sub-ceiling constituting a single, continuous panel.

It is another object of this invention to provide a luminous ceiling structure of the character indicated in which provision is made for vertical adjustment of the hanger rods aforesaid.

It is another object of this invention to provide a luminous ceiling structure of the character indicated in which provision is made for universal lateral adjustment of the hanger rods aforesaid with respect to the lighting fixtures from which said rods are suspended whereby the lighting fixtures need not be precisely secured to the room ceiling.

It is another object of this invention to provide an overhead lighting system in which the elongated lighting fixtures may be installed in parallel rows extending all the way from one outside building wall to the opposite outside wall, the room partitions terminating short of the ceiling proper and being provided with adjustable light and sound stops which close the spaces between the room partitions and the ceiling proper and thus serve to isolate one room from the next insofar as light and sound is concerned.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 3 is a cross-section view taken in a vertical plane (3—3, Fig. 1) transverse to the elongated fluorescent lighting fixtures;

Fig. 6 is a vertical cross-section view taken substantially along the line 6—6, Fig. 1;

Fig. 7 is a cross-section view, similar to Fig. 3, except illustrating a modification;

Fig. 8 is a top plan view of the panel corner support head or rosette;

Fig. 9 is a side elevation view of the head or rosette of Fig. 8; and

Figs. 10 and 11 are cross-section and bottom plan views of a modification.

Figure 1:
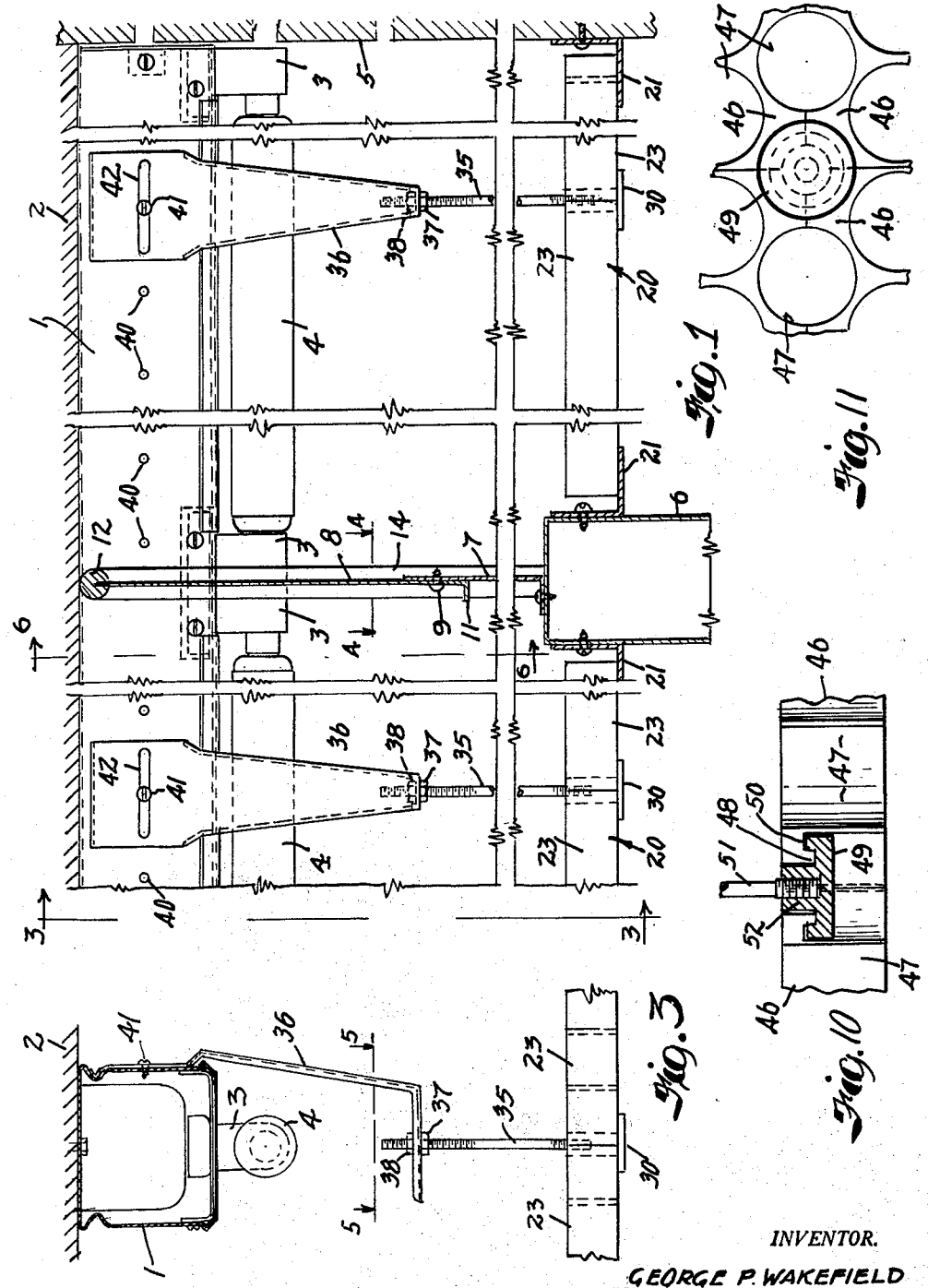
Fig. 1 is a fragmentary vertical cross-section view of one form of the present invention, such section having been taken longitudinally of the lighting fixtures.
Figure 2:
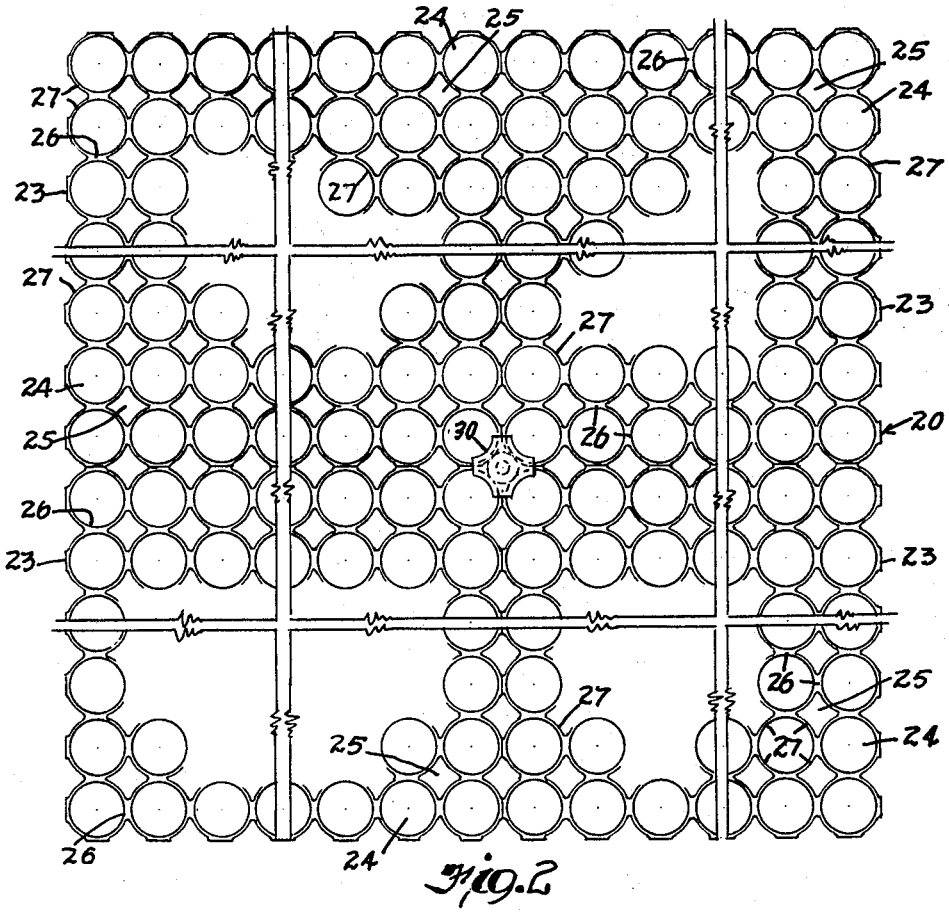
Fig. 2 is a bottom plan view as viewed upward from beneath the light-diffusing sub-ceiling.

Referring now in detail to the drawings, the reference numeral 1 denotes the elongated channel of a fluorescent lighting fixture which is attached to the ceiling proper 2 of the room and which is equipped with paired sockets 3 mounting the ends of a row of tubular illuminators 4. As is apparent, said lighting fixtures 1 will be attached to the ceiling proper in parallel rows so as to extend, if desired, all the way from one outside wall 5 of the building to the opposite outside wall.

As best shown in Figs. 1 and 6, the room partition 6 terminates short of the ceiling proper 2, and in order to isolate one room from the next, said partition 6 has secured thereto a flanged metal strip 7 to which light and sound stop plates 8 are vertically adjustably secured as by means of screws 9 which are threaded into said strip 7 and which pass through vertical slots 10 formed adjacent the bottom edge of said plates 8. The plates 8 may be stiffened by bottom flanges 11.

Figure 4:
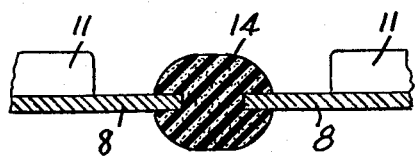
Fig. 4 is a detail cross-section view, on an enlarged scale, taken substantially along the line 4—4, Fig. 1.
Figure 5:
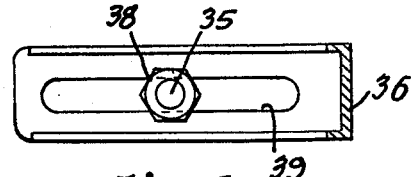
Fig. 5 is a cross-section view, on an enlarged scale, taken substantially along the line 5—5, Fig. 3.

The top marginal edge of each plate 8 fits in a groove of a sponge sealing strip 12, and the ends of adjacent plates 8 and strips 7 extend into grooves of another sponge rubber sealing strip 14 therebetween (see Fig. 4).

The sockets 3 which are back to back are spaced apart to allow the plates 8 to pass therebetween and to fit around the channel 1, additional sealing strips 15 and 16 being provided to seal along the sides and the bottom of the channel, and against the back-to-back sockets 3.

Accordingly, with such an arrangement, adjacent rooms are isolated from each other, both from the standpoint of lighting and from the standpoint of sound, as well as from heat, cold, odor, or other environmental conditions which prevail in one room and which are not desired to be transmitted to another room.

Insofar as the overall, low brightness illumination of the room spaces is concerned, there is provided a substantially continuous light-diffusing sub-ceiling 20 spaced beneath the lighting fixtures 1, the marginal edge portion of such sub-ceiling being supported as by the wall-attached angles 21.

The light-diffusing sub-ceiling 20 here is shown as comprising a plurality of edgewise abutting rectangular panels 23 which are perforated or honeycombed and made as of white, translucent plastic. A preferred size of the panels 23 is 36" square, with 1¼" diameter circular openings 24 therethrough and intervening openings 25 leaving webs 26 of about .1368" thickness between adjacent circular openings 24 and arcuate webs 27 of about .068" thickness between the openings 24 and 25. It has been found that, when said panels 23 are of about 1¼" thickness and spaced about 10" below the tubular illuminators 4, effective diffusion of the light is effected without glare, and, in addition, direct view of the illuminators is shielded at all angles between horizontal and downward to about 45°.

As shown, the edges of the panels 23 are formed that, when said panels are positioned in edgewise abutting relation, the entire sub-ceiling appears to be of unitary, uniform construction extending all the way across from one end wall of the room to the other and from one side wall of the room to the other.

The only interruptions (decorative) in the continuity of the sub-ceiling area 20 are the relatively small and hardly noticeable rosettes 30 which also are preferably made of white, translucent plastic. As is best shown in Figs. 8 and 9, each rosette 30 comprises a vertically extending stem 31 which is internally threaded, and the lower end 32 projects laterally and is formed with curved ribs 34 which laterally interlockingly fit within the webs 27 at the meeting corners of the panels 23.

The rosettes 30 thus underlie four meeting corners of the panels 23 to support the same, and, in addition, the interlocking as aforesaid holds the panels 23 together in snug edgewise abutting relation so that they cannot become displaced relatively apart and thereby interfere with the continuous effect created by the abutting panels 23. The stem 31 extends up into the corner openings 25 which are formed by four edgewise abutting panels 23.

The rosettes 30 are connected to the lower threaded ends of hanger rods 35 as shown in Figs. 1, 3, and 7, and the upper threaded ends of said rods pass through the slotted lower ends of brackets 36. As evident, by adjusting the nuts 37 and 38 which straddle the brackets 36, said rods 35 and rosettes 30 may be vertically adjusted so that the laterally projecting portions 32 of the rosettes will be in the same horizontal plane as the wall-attached angles 21, and in this way the panels 23 will be supported in a common horizontal plane.

By reason of the provision of slots 39 in the horizontal legs of the brackets 36, the rods 35 may be laterally adjusted with respect to the lighting fixtures 1; and, therefore, it is not necessary to accurately mount the lighting fixtures 1 to the ceiling proper 2. This lateral adjustment, together with the longitudinal adjustment afforded by the slotted upper ends of the brackets 36 which are secured to one side of the lighting fixtures 1, makes possible the universal adjustment of the rods 35 so that they and the rosettes 30 will be exactly aligned with the meeting corners of the panels 23.

The sides of the lighting fixtures 1 are provided with a series of holes 40 for the screws 41 so that the brackets 36 may be accurately adjusted anywhere throughout the lengths of the fixtures 1. In other words, if the longitudinal adjustment of a bracket 36 is insufficient for the length of slot 42 provided, all that it is necessary to do is to shift the bracket and to mount the screw 41 into the next or any other hole 40 in the side of the channel 1.

As a further feature of this invention, the brackets 36 as shown in Fig. 7 may carry reflectors 43 disposed underneath the fluorescent illuminators 4 so as to illuminate the room space by indirect reflected light. The reflectors 43 may be secured, as by rivets, to the horizontal legs of brackets 36 as by means of supports 45. The reflectors may be translucent plastic to provide the same brightness as on surface 2.

Referring now to Figs. 10 and 11, the translucent plastic panels 46 are formed with openings 47 therethrough, the meeting corners forming a recess with a downwardly extending annular rib 48. The support member 49, also of translucent plastic, has an upwardly extending annular rib 50 which embraces ribs 48 to thus lock the panel corners together. As before, the hanger rod 51 has threaded engagement in the stem 52 of the support member.

Other modes of applying the principle of the invention may be employed, change being made as regards the details described, provided the features stated in any of the following claims, or the equivalent of such, be employed.

I therefore particularly point out and distinctly claim as my invention:

1. The combination with an overhead room lighting system including parallel rows of ceiling-attached, elongated lighting fixtures, of a substantially continuous light diffusing sub-ceiling spaced beneath said fixtures and formed with uniformly spaced criss-cross rows of openings therein; support rails underlying the marginal edge portion of said sub-ceiling; said sub-ceiling comprising transversely and longitudinally edge wise abutting and relatively rigid, uniform size rectangular panels forming continuations of the rows of openings in said sub-ceiling at their abutting edges and at their meeting corners to create the illusion that said sub-ceiling comprises but a single large panel, each of the corners of each panel comprising a web that connects the walls forming adjacent openings thereto, said webs of contiguous panels forming an opening similar to the remaining openings in a panel; and rod-like support members depending downwardly from said fixtures having very small lateral projections, in relation to the lengths and widths of said panels, at their lower ends which underlie and support each of four of said webs at the panel corners of the panels which are disposed within the marginal edge portions of said sub-ceiling; such panel corner webs being formed with downwardly extending ribs and said support members being formed with upwardly extening ribs that laterally embrace the ribs on the panel corner webs to hold said panels in such edgewise abutting engagement.

2. The combination of claim 1 wherein said lateral projections are of a size so as to be recessed in the openings formed at the meeting of four panel corners.

3. The combination of claim 1 wherein said support members comprise upper parts that are secured to the sides of said fixtures for longitudinal adjustment relative to the latter, and lower parts having said projections at their lower ends that are secured to the respective upper parts for lateral adjustment relative to said fixtures whereby said projections may be aligned with the openings at such meeting panel corners.

4. The combination of claim 3 wherein said upper parts comprise brackets having longitudinally slotted upper ends that are longitudinally adjustably secured to said fixtures and having laterally slotted lower ends in which the upper ends of said lower parts are laterally adjustably secured.

References Cited in the file of this patent

UNITED STATES PATENTS

| | | |
|---|---|---|
| 1,933,221 | Rockhoff | Oct. 31, 1933 |
| 1,962,648 | Pflueger | June 12, 1934 |
| 1,984,028 | Macleod | Dec. 11, 1934 |
| 2,398,507 | Rolph | Apr. 16, 1946 |
| 2,612,243 | Campbell | Sept. 30, 1952 |
| 2,659,807 | Wakefield | Nov. 17, 1953 |
| 2,660,270 | Jenkins et al. | Nov. 24, 1953 |
| 2,725,126 | Ely | Nov. 29, 1955 |
| 2,725,127 | Barrett et al. | Nov. 29, 1955 |
| 2,734,126 | Kruger | Feb. 7, 1956 |

FOREIGN PATENTS

| | | |
|---|---|---|
| 1,022,671 | France | Dec. 17, 1952 |